J. Chase Jr.
Bake-Pan.
Nº 75524. Patented Mar. 17, 1868
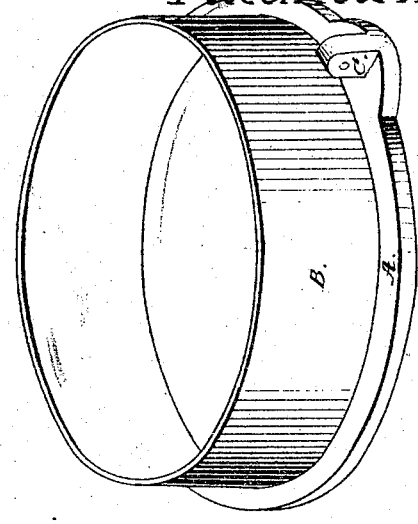
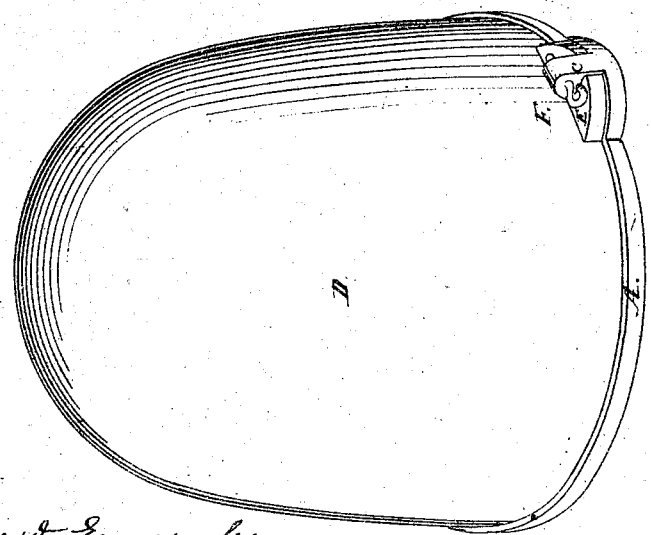

United States Patent Office.

JUSTUS CHASE, JR., OF WATERTOWN, NEW YORK.

*Letters Patent No. 75,524, dated March 17, 1868.*

---

IMPROVEMENT IN BAKE-PANS.

---

*The Schedule referred to in these Letters Patent and making part of the same.*

---

TO ALL WHOM IT MAY CONCERN:

Be it known that I, JUSTUS CHASE, Jr., of Watertown, in the county of Jefferson, and State of New York, have invented a new and useful Improvement in the Construction of Pans for Baking Corn, Rye, or other Bread; and I do hereby declare that the following is a full, clear, and exact description of the construction and operation of the same, reference being had to the annexed drawings, making a part of this specification, in which—

Figures 1 and 2 are perspective views.

The nature of my invention consists in so constructing a bread-pan that the steam or moisture of the dough, which is evaporated during the process of baking the dough into bread, cannot escape from the pan without passing downwards through the dough, thus producing bread of the desired moistness, and giving it (in the case of corn or rye bread) a desirable color and flavor and the desideratum of a thin crust.

To enable others skilled in the art to make and use my invention, I will proceed to describe its construction and operation.

The pan, as a whole, is made of cast iron, and in two parts, fig. 1 being the bottom part, (or pan proper,) and fig. 2 the cover. The interior surface of both pan and cover is enamelled in the same manner as is the enamelled hollow iron-ware. The pan (fig. 1) is formed of the circular disk A, the annular flange or ring B rising perpendicularly to the disk, and the ear C, which ear is duplicated in the side of the disk A, opposite to that shown in fig. 1. D (fig. 2) is the cover, of sufficiently greater internal diameter at its base than the exterior diameter of the ring B, so that when the cover is placed on the pan, there will be, between the base of the cover and the ring, what is termed a "close fit." The form of the cover is conoidal, which is the best adapted to the purpose, the cover being a hollow conoid, and of sufficient height above the dough and bread to afford "steam room." E (fig. 2) is an ear, cast on the base and side of the cover, and is duplicated on the base and side of the cover opposite to it. F, in fig. 2, is a pin, passing through the lug of the ear C, and is to secure the cover to the pan.

The process of baking is conducted as follows: A sufficient quantity of dough is placed in the pan to nearly fill it to the top of the ring. The dough is then allowed to "prove" or "raise" the proper length of time, but not so long that it will run over the ring. The cover is then placed on the pan and secured to it, as shown in fig. 2, the pin F, and the hole in which it enters, being so fitted and arranged that the cover will be held closely to the pan. (N. B. The drawing shows too much "play" between the pin and ear E.) The pan, with its contents, is then placed in the baking-oven, (the oven should be of moderate heat,) and the baking continued for about four hours.

The advantages of my improvement are the following: The heat of the oven, of course, generates steam from the moisture in the dough, and continues so to do through the process of the conversion of the dough into bread. There being no escape for the steam except at the joint formed by the junction of the base of the cover with the pan, the dough and bread are being constantly permeated with the steam during the process of baking. This produces and preserves a moistness in the bread, which is a desirable quality, and which cannot be effected in bread-pans of the ordinary construction. The bread, if corn or rye, is colored a reddish brown, which is a desideratum, and the crust, instead of being thick, hard, and difficult of mastication, and therefore often wasted, is thin, and of nearly the same consistency of the interior of the loaf. The enamel lining is a preventive of any discoloration of the bread and unpleasant flavor, the internal moisture of the pan preventing the slackening of the enamel.

Having thus described my invention, what I claim, and desire to secure by Letters Patent of the United States, is—

The bread-pan, consisting of dome D and base A B, with suitable connecting-devices, constructed as herein described, and for the purposes set forth.

In testimony whereof, I have signed my name to this specification before two subscribing witnesses.

JUSTUS CHASE, JR.

Witnesses:
   FRED. EMERSON,
   JNO. M. SIGOURNEY.